United States Patent
Gross et al.

(10) Patent No.: US 8,100,360 B2
(45) Date of Patent: Jan. 24, 2012

(54) LIGHT RAIL SYSTEM FOR POWERED INTRODUCTION OF LARGE LOADS IN A STRUCTURE

(75) Inventors: Claus-Peter Gross, Buxtehude (DE); Cord Haack, Beckdorf (DE); Dirk Humfeldt, Hamburg (DE); Oliver Thomaschewski, Hamburg (DE)

(73) Assignee: Airbus Deutschland GmbH (DE)

( * ) Notice: Subject to any disclaimer, the term of this patent is extended or adjusted under 35 U.S.C. 154(b) by 808 days.

(21) Appl. No.: 12/214,252

(22) Filed: Jun. 17, 2008

(65) Prior Publication Data
US 2009/0014586 A1 Jan. 15, 2009

Related U.S. Application Data

(60) Provisional application No. 60/959,306, filed on Jul. 11, 2007.

(30) Foreign Application Priority Data

Jul. 11, 2007 (DE) .......................... 10 2007 032 235

(51) Int. Cl.
*B64C 1/00* (2006.01)
*B64C 1/20* (2006.01)
*B64C 1/22* (2006.01)

(52) U.S. Cl. ................. 244/119; 244/117 R; 244/118.1; 244/118.5; 244/118.6; 244/120; 244/129.1; 244/131

(58) Field of Classification Search .............. 244/117 R, 244/118.1, 118.2, 118.5, 118.6, 119, 120, 244/129.1, 131
See application file for complete search history.

(56) References Cited

U.S. PATENT DOCUMENTS

| 4,456,206 A * | 6/1984 | Tijssen ........................ 244/118.5 |
| 4,932,816 A * | 6/1990 | Ligensa ................... 244/118.6 X |
| 5,131,606 A * | 7/1992 | Nordstrom .................. 244/118.1 |
| 5,234,297 A * | 8/1993 | Wieck et al. ........... 244/118.1 X |
| 5,489,172 A * | 2/1996 | Michler ................. 244/118.1 X |
| 5,564,654 A * | 10/1996 | Nordstrom .................. 244/118.1 |
| 5,897,079 A * | 4/1999 | Specht et al. ............... 244/118.5 |
| 6,554,225 B1 * | 4/2003 | Anast et al. ................. 244/117 R |
| 6,902,365 B1 * | 6/2005 | Dowty .................... 244/118.6 X |
| 6,948,684 B2 * | 9/2005 | Beral et al. ..................... 244/119 |
| 7,059,565 B2 | 6/2006 | Scown et al. |
| 7,338,013 B2 * | 3/2008 | Vetillard et al. .......... 244/117 R |
| 7,455,276 B2 * | 11/2008 | Frey ....................... 244/118.6 X |
| 7,475,850 B2 * | 1/2009 | Vetillard et al. .......... 244/117 R |
| 7,614,583 B2 * | 11/2009 | White ........................ 244/118.1 |
| 7,837,145 B2 * | 11/2010 | Wodak ....................... 244/118.6 |
| 7,887,008 B2 * | 2/2011 | Lamoree et al. ........... 244/118.1 |
| 2006/0243858 A1 * | 11/2006 | Anghileri .................... 244/118.1 |
| 2007/0138821 A1 * | 6/2007 | Mejuhas et al. ....... 244/118.6 X |
| 2008/0067289 A1 * | 3/2008 | Meyer ........................... 244/131 |

(Continued)

FOREIGN PATENT DOCUMENTS

DE 19955397 1/2001

(Continued)

*Primary Examiner* — Rodney B White
(74) *Attorney, Agent, or Firm* — Lerner, David, Littenberg, Krumholz & Mentlik, LLP

(57) ABSTRACT

A device for securing installed equipment in an airplane, with one or more oblong attachment rails, one or more attachment means for securing the attachment rails to an airframe structure, and one or more bracket units that can be attached to or in the attachment rails, wherein the bracket units can be attached to the built-in apparatuses to be secured.

23 Claims, 4 Drawing Sheets

U.S. PATENT DOCUMENTS

| | | | |
|---|---|---|---|
| 2008/0135683 A1* | 6/2008 | Piesker | 244/129.1 |
| 2008/0197234 A1* | 8/2008 | Wilhelm et al. | 244/118.6 |
| 2009/0026318 A1* | 1/2009 | Gross et al. | 244/131 |
| 2009/0294587 A1* | 12/2009 | Ricaud et al. | 244/119 |
| 2010/0243805 A1* | 9/2010 | Gross et al. | 244/119 |
| 2011/0024560 A1* | 2/2011 | Horst et al. | 244/118.5 |

FOREIGN PATENT DOCUMENTS

| | | |
|---|---|---|
| DE | 19955297 | 4/2001 |
| DE | 10337746 | 3/2005 |

\* cited by examiner

LIGHT RAIL SYSTEM FOR POWERED INTRODUCTION OF LARGE LOADS IN A STRUCTURE

CROSS-REFERENCE TO RELATED APPLICATIONS

This application claims the benefit of the filing date of U.S. Provisional Patent Application No. 60/959,306 filed Jul. 11, 2007, the disclosure of which is hereby incorporated herein by reference.

BACKGROUND OF THE INVENTION

The invention relates to a device for securing installed equipment in an airplane.

Such devices are known from DE 199 55 397 C1, for example. Shown therein is a bracket device that can be secured to the stringer of an airframe structure and hold devices or instruments. The stringer is here mechanically secured to the airframe with its beveled long side, and situated at a predetermined distance from the airframe structure with its rounded long side. The bracket device can be quickly attached with one hand to different locations of a stringer, and exhibits a grooved recess adapted to the outer contour of the stringer for this purpose. The stringer engages the recess of the bracket device in such a way that the bracket device completely envelops the stringer partially in its longitudinal direction, and nearly completely or completely in its transverse direction, and abuts the inner wall of the airframe structure with an outer surface. A locking element establishes a positive connection with the stringer, wherein the locking element can be shifted nearly perpendicular to the grooved recess against the force of a compression spring.

Also known from prior art is to introduce loads comprised of system installations and cabin components into the primary structure of the airplane fuselage primarily via individual "brackets". The brackets are here normally secured to fuselage frames and individually to stringers and the fuselage skin, which absorb the loads from the system.

Introduction of load using individual bracket devices may result on an initial dependence of the attachment points on a frame or stringer grid. In addition, the optimal layout of the fuselage frame or stringer may be impeded by numerous unforeseeable bracket positions: Local load introductions require that the structure be reinforced. Further, the usual concept in prior art requires a high number of parts, so that the assembly and outfitting expenses increase. The design and outfitting of the passenger cabin is relatively inflexible owing to the limited selection of positions for the bracket devices, and the restricted individual adaptability to customer demands. In addition, holes in the insulation may be required for the individual bracket devices.

SUMMARY OF THE INVENTION

According to an exemplary embodiment of the present invention, a device for securing installed equipment in an airplane is provided with which one or more oblong attachment rails, one or more attachment means for securing the attachment rails to an airframe structure, and one or more bracket units that can be attached to or in the attachment rails, wherein the bracket units can be attached to the installed equipment to be secured.

This may provide for a device for securing built-in apparatuses in an airplane that requires as few different parts as possible, is easy to assemble and can be especially easily adjusted to the equipment to be accommodated.

The use of attachment rails is particularly advantageous, since individually outfitting an airplane as a result may not entail a plurality of different brackets on stringers or frames for the airframe structure, but can rather load introduction points may be continuously provided over the entire length of the airplane. Attachment rails may be fitted with nearly however many bracket units desired, to which built-in apparatuses may be secured. The force introduced in the attachment rails is relayed to precisely predefined points in the airframe structure, so that the load introduction sites there may already be taken into account during the configuration of the airplane and airframe structure. As a consequence, none of the unforeseen load scenarios caused by the variability of outfitting may damage the structure of the airplane.

Installed equipment refers generally to all parts, components, systems and the like to be secured in any way to the structure. An incomplete list of examples would here include parts of the cabin equipment, such as cladding and storage compartments, or also electrical, hydraulic and mechanical systems.

Other advantageous embodiments are disclosed in the subclaims. In particular, the attachment rails can be used not just for securing built-in apparatuses, but also to reinforce the airframe structure. This dual functionality may make it possible to additionally economize on weight, since reinforcing components of the airframe structure, such as stringers, can be omitted or dimensioned less strongly at corresponding locations.

Also conceivable is a separation of the positioning and load introduction functions for an attachment rail, which may result in a special embodiment of the device according to the invention. This embodiment provides a less strongly dimensioned positioning rail that exhibits latching means, on or to which an additional rail unit can be secured and latched in a predetermined position that guides the acting load over its entire width into the less strongly dimensioned positioning rail. As a result, an especially stable, and hence correspondingly heavy, rail structure is present only at attachment sites exposed to higher loads, while only especially lightweight positioning rails are present in all remaining locations in the airframe.

According to an exemplary embodiment of the present invention, an attachment rail of the kind specified in the secondary claims is provided.

The invention will be described in greater detail based on the figures. Identical objects are denoted by the same reference number in the figures.

DETAILED DESCRIPTION

Figure 1:
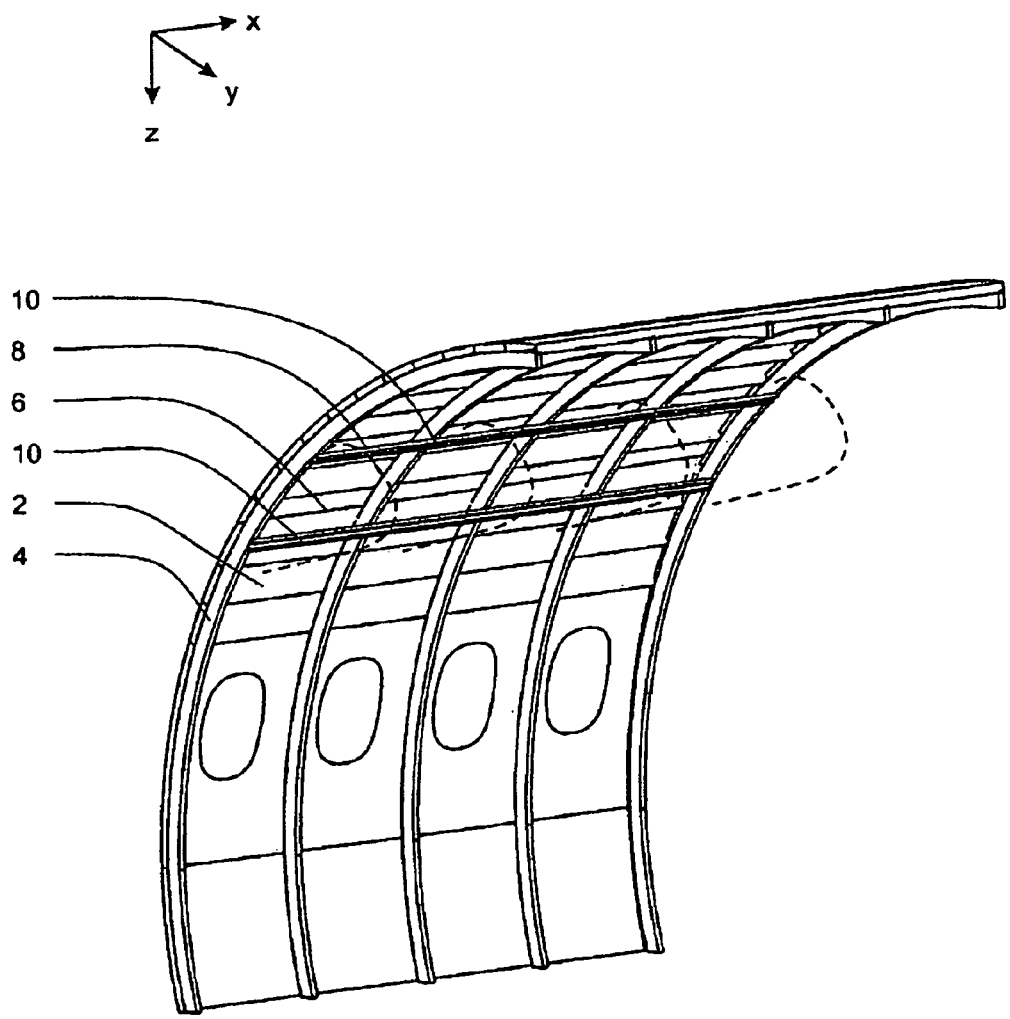
FIG. 1: is a diagrammatic view of the device according to an exemplary embodiment of the present invention.

FIG. 1 shows a section of a skin 2 of an airplane reinforced with frames 4 and stringers 6. The frames 4 and stringers 6 in conjunction with the skin 2 make up the airframe structure. Installed equipments (Built-in apparatuses) are secured to the airframe structure, making up the equipment of the airplane. Part of the airplane equipment consists of the interior equipment of the passenger cabin, which includes the storage compartments 8 situated over the passenger seats and denoted with a dashed line on FIG. 1 (also called "hat rack" or "overhead bin"). The storage compartments will be used in the following as an example to describe the device according to the invention in more detail.

All directional indications, such as "longitudinal direction" or "transverse direction", relate to the coordinate system shown on FIG. 1, in which the x-axis runs parallel to the longitudinal axis of the airplane, the y-axis runs parallel to the transverse direction or pitch axis, and the z-axis runs parallel to the vertical or yaw axis of the airplane.

The storage compartments 8 secured to the airframe structure and extending on either side from the cabin sides in a transverse direction are often completely filled with baggage during flight, and introduce a load into the airframe structure owing to the mass of the baggage. A sufficiently stable attachment is required to prevent the storage compartments 8 from falling on the passengers underneath. In addition, the airframe structure must be sufficiently strong at the attachment points to allow the airframe structure to completely bear the load introduced.

Since the interior equipment of an airplane may depend on the wishes of the airline operator and respective class categorization inside the passenger cabin, a plurality of different design possibilities, and hence a plurality of various attachment points, are conceivable for all kinds of built-in apparatuses for an airplane to be manufactured. The device according to an exemplary embodiment of the invention permits the flexible outfitting of an airplane, in that all conceivable attachment positions for built-in apparatuses can be continuously provided by means of attachment rails 10, without having to prepare individual attachment points for the built-in apparatuses to be secured in the airframe structure itself during the manufacture of the airplane.

According to the invention, attachment rails 10 are essentially arranged parallel to the longitudinal axis of the airplane, and are, for example, secured to the frames 4 of the airframe structure on both sides viewed from inside the passenger cabin. The locations where the attachment rails 10 are secured to the frames 4 are also called load introduction points in light of the load introduction. The objective is to provide only a type of attachment rails 10 that remains constant for all outfitting variants, and individually secure built-in apparatuses thereto. As a consequence, the load introduction points on the frames 4 can be optimized and considered already during the design of the airplane and airframe structure, instead of having to accept random load introduction points and generally be more generous in laying out the frames 4.

Thermal expansion effects of a metal airframe structure make it necessary to secure the attachment rails 10 to the airframe structure mechanically decoupled in such a way that the airframe structure can expand or contract in a longitudinal direction during operation with no ill effects. A fixed and loose mounting of attachment rails 10 is suitable to this end. However, it may also be advantageous in some applications to use the attachment rails 10 not just as an attachment means for built-in apparatuses, but also as a functional part of the airframe structure. Given their arrangement in a longitudinal direction, the attachment rails can be used as additional stringers 6, which are rigidly connected with the remaining airframe structure, just as conventional reinforcing components. As a result, the stringers 6 can be less strongly dimensioned or omitted at suitable locations.

Figure 2A:
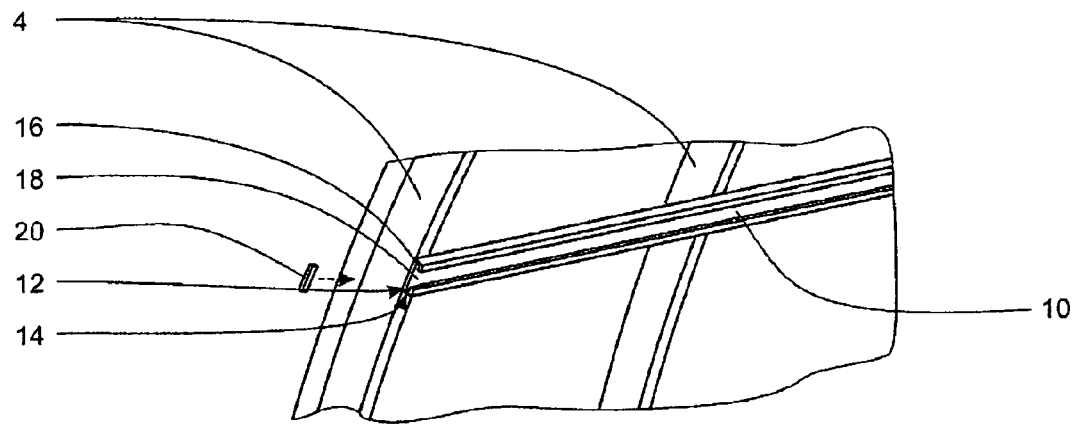
FIGS. 2a and 2b: is a diagrammatic view of two attachment variants of the attachment rail according to an exemplary embodiment of the present invention.
Figure 2B:
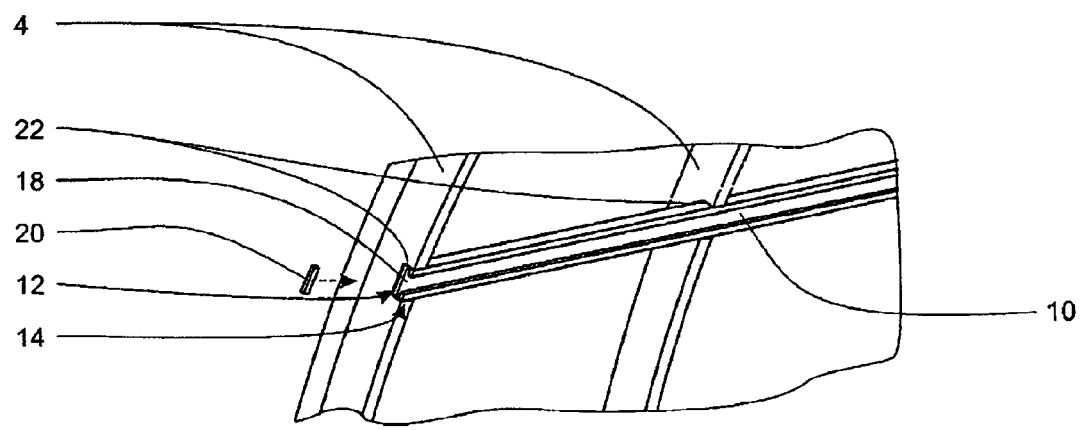

The attachment rails 10 may be secured to the airframe structure in a variety of ways, of which two examples are given on FIG. 2a and FIG. 2b. The attachment rails 10 on FIG. 2a are on the inside of the frames 4, and there secured with whatever attachment elements desired (not shown in any greater detail), which can be shaped like brackets for exactly positioning the attachment rails 10, for example. Since the attachment rails 10 extend through one or more thermal insulation layers into the passenger cabin, it makes sense to also thermally decouple the attachment rails 10 from the frames 4. For example, thermal protection layers with a very low thermal conductivity may be applied to the attachment sites of the attachment rails 10.

FIG. 2a further depicts an exemplary cross section 12 of a conceivable profile of an attachment rail 10, which here is c-shaped. The flanks 16 extending from the outer edges 14 of the profile 12 into the profile interior provide a back-cut depression 18, into which a bracket unit 20 can be placed to establish a positive connection. A bracket unit 20 has a rectangular cross section, for example, which allows introduction between the flanks 16 into the recess 18, while completely filling the width and height of the depression 18 when turned by about 90°. The c-shaped profile 12 here represents only an example, wherein any other beveled, curved or flat profiles 12 are conceivable for yielding a positive and/or non-positive bond between a bracket unit 20 and an attachment rail 10. On the other hand, the attachment rail could also be designed as a pin diaphragm.

FIG. 2b introduces another possible way of securing an attachment rail 10 to the frames 4 of an airframe structure. Adjacent frames 4 here exhibit recesses 22, whose dimensions correspond to the respective outer dimensions of the profile 12 of an attachment rail 10. An attachment rail 10 can be incorporated into adjacent recesses 22 of adjacent frames 4, and bonded non-positively, positively or materially with the frames 4. The advantage to this variant is that the attachment rails 10 do not take up any additional (radial) building space in the transverse direction.

Figure 3A:
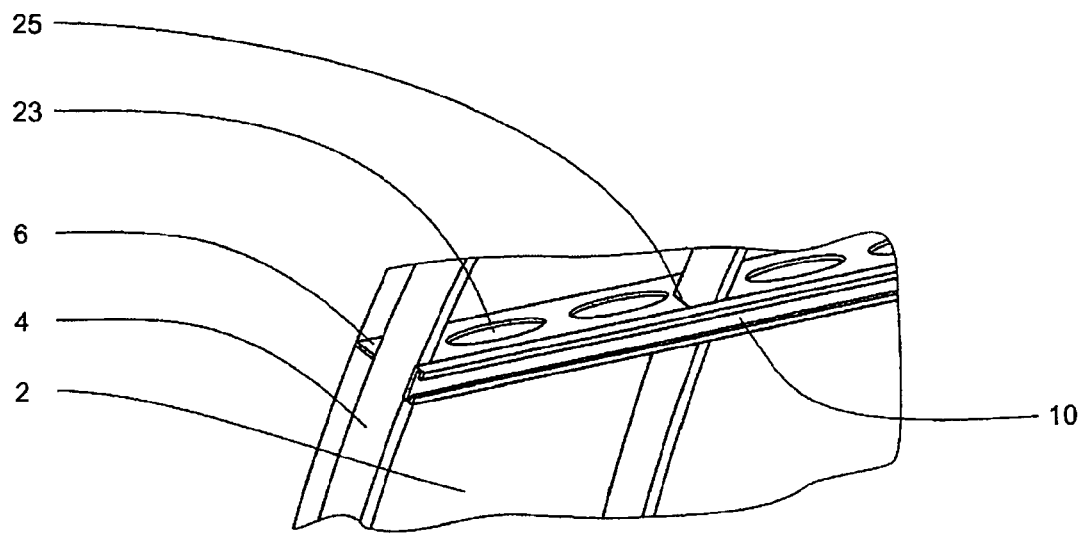
FIGS. 3a and 3b: is a diagrammatic view of two embodiments of the attachment rail according to the invention, and on FIG. 4: is a diagrammatic view of an especially lightweight embodiment of the device according to the invention.
Figure 3B:
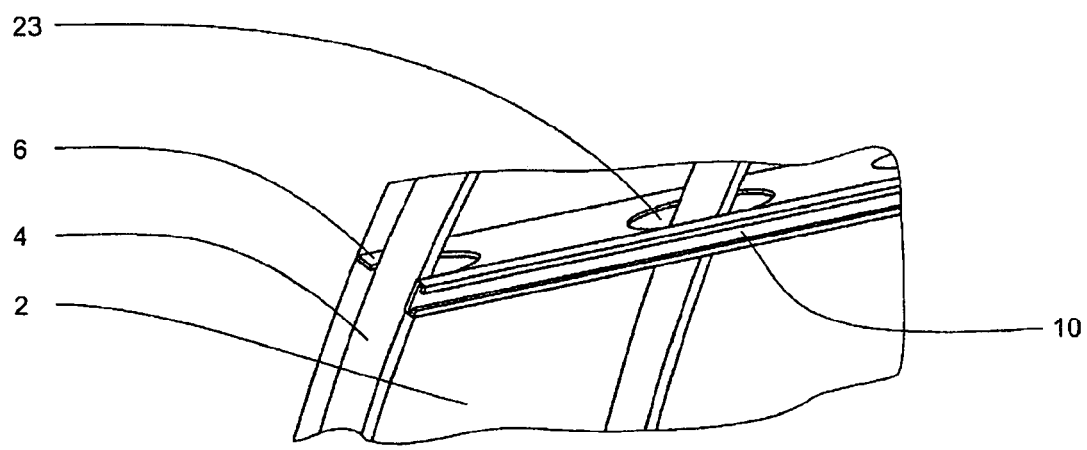

FIGS. 3a and 3b each show an attachment rail 10 that is formed out of a stringer 6 extending essentially radially from the outer skin of the airplane over the frames 4, or is connected with such a stringer 6. This combination of a stringer 6 and attachment rail 10 makes it possible simultaneously to perform the functions of a stringer 6, save on attachment points on the frames 4, and reduce the variety of parts.

The structural loads are conveyed from the outer skin 2 of the airplane in a stringer 6 designed in this way and elongated in a radial direction by preferably realizing the space between the attachment rail 10 and outer skin 2 as a kind of thrust sheet or the like, which is also provided with openings 23 to save on weight. According to FIG. 3a, the stringer 6 can exhibit recesses 25 to fit in the frames 4, or the frames 4 are guided through several of the openings 23 according to FIG. 3b.

In some applications, it may be advantageous despite the mentioned advantages, e.g., for purposes of redundancy, to secure an attachment rail 10 not just to a radially elongated stringer 6, but also simultaneously to the frames 4.

Figure 4:
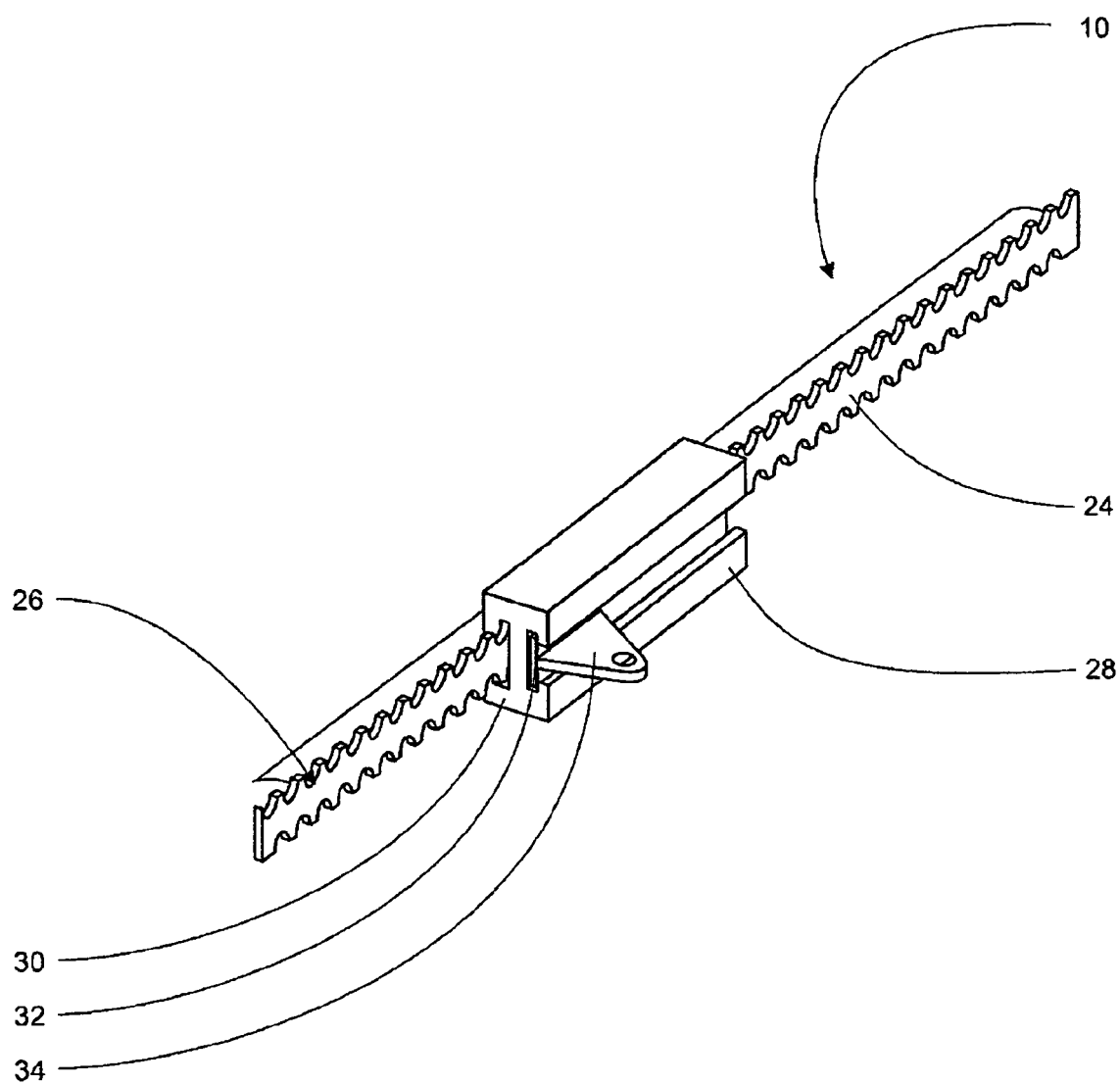

Finally, FIG. 4 discloses an expanded exemplary embodiment of the device according to the invention, which combines several advantages. The attachment rail 10 shown there is characterized by a division of the rail functions involving positioning and load absorption by components separated from each other. The attachment rail 10 has a positioning rail 24, which is secured to the airframe structure over the length of the airframe to be covered. The positioning rail 24 has a profile, whose cross section is insufficiently dimensioned to completely absorb a point load introduced by built-in apparatuses and introduce it into the airframe structure. In addition, the longitudinal edges of the positioning rail 24 exhibit depressions 26 that serve as index notches and are periodically arranged over the entire or at least a portion of their length. As an alternative, a perforated grid or other types of positive or non-positive bonds are conceivable. This part of the device has a positioning function.

This exemplary embodiment of the device further encompasses a rail unit 28 designed in such a way that it can be slipped or plugged onto the positioning rail 24. The side of the rail unit 28 facing the positioning rail 24 has latching bodies that correspond with the index notches 26 of the positioning rail 24, so that latching in the latching bodies results in an exact positioning of the rail unit 28 along the longitudinal axis of the positioning rail 24. The rail unit 28 is used to perform the load introduction function.

The rail unit 28 is itself designed as a rail, and hence exhibits a profile cross section 30 with a depression 32, into which one or more bracket units 34 can be introduced. The built-in apparatuses to be secured to the airframe structure are connected with the bracket units 34. The bracket units 34 enter into a positive bond with the rail unit 28, and transfer the load applied to the bracket unit 34 over the entire width of the rail unit 28 and into the positioning rail 24. Therefore, the positioning rail 24 need not be designed to absorb the entire load given a point introduction. The positioning rails 24 are hence distinctly lighter in weight. If the loads to be applied to the airframe structure are clearly smaller, e.g., than those from the storage compartments 8, it may also be sufficient to secure them directly to the positioning rail 24, so that a corresponding rail unit 28 can be omitted in this location.

The device according to the invention may provide a way of positioning and securing built-in apparatuses in an airplane as flexibly as possible, but without having to use a great variety of different bracket units. The exemplary embodiments depicted and explained with the figures do not limit the subject matter of the invention, but rather serve only to better illustrate the concept underlying the invention. Therefore, all built-in apparatuses situated in an airframe can be secured by means of the device according to the invention, which can in turn again exhibit all conceivable design features, such as profile cross sections, latching means, attachment means, bracket units and the like.

It should be noted that the term "comprising" does not exclude other elements or steps and the "a" or "an does not exclude a plurality. Also elements described in association with different embodiments may be combined.

It should also be noted that reference signs in the claims shall not be construed as limiting the scope of the claims.

The invention claimed is:

1. A device for securing installed equipment in an airplane, the device comprising:
   one or more oblong attachment rails;
   one or more attachment means for securing the attachment rails to an airframe structure; and
   one or more bracket units adapted for being one of attached to or in the attachment rails; the bracket units are adapted for being attached to the installed equipment to be secured;
   wherein each attachment rail is not an integral part of a stringer.

2. The device of claim 1,
   wherein the attachment rails are adapted for being secured to the airframe structure substantially parallel to a longitudinal axis of the airplane.

3. The device of claim 1, wherein the attachment rails comprise at least one of a singly or multiply beveled, or bent, profile cross section.

4. The device of claim 1, wherein the attachment rails include a substantially flat profile cross section.

5. The device of claim 1, further comprising one or more additional rail units, which are adapted to be plugged or slipped onto the attachment rails, and include a profile cross section with a depression for introducing one or more bracket units.

6. The device of claim 1,
   wherein the attachment rails include at least one of a periodic surface or edge profiling running in the longitudinal direction as notches, on or into which rail units can be latched.

7. The device of claim 6,
   wherein the rail units include latching units for latching into the notches.

8. The device of claim 1,
   wherein the attachment means are formed having a low thermal conductivity or a coating with a low thermal conductivity suitable to thermally insulate the attachment rails relative to the airframe structure.

9. The device of claim 1,
   wherein the attachment rails are mechanically coupled with the airframe structure in such a way as to reinforce the airframe structure in the longitudinal direction of the airplane.

10. The device of claim 1,
    wherein the attachment rails are mechanically decoupled from the airframe structure, so that they prevent absorption of loads from the airframe structure.

11. The device of claim 1,
    wherein the attachment rails include a substantially c-shaped profile cross section for accommodating bracket units.

12. The device of claim 11,
    wherein the frames include recesses on the sides opposite the outer skin for completely accommodating the profile cross section of the attachment rails.

13. The device of claim 1,
    wherein the attachment rails include a perforated grid for accommodating bracket units.

14. The device of claim 1,
    wherein the attachment rails are adapted for being secured to stringers arranged in direct proximity thereto, which extend substantially in a radial direction from an outer skin of the airplane to just into the area of the inner radial periphery of the frames.

15. The device of claim 1,
    wherein a bond between the bracket units and attachment rails comprises at least one of a non-positive bond or a positive bond.

16. An attachment rail with an oblong shape for attaching installed equipment in an airplane, comprising attachment means,
    wherein the attachment rail is adapted to be secured to an airframe structure by way of the attachment means, and wherein the attachment rail is adapted such that one or more bracket units for securing built-in apparatuses can be attached at least one of to, or into, the attachment rail, wherein the attachment rail is not an integral part of a stringer.

17. The attachment rail of claim 16,
    wherein the attachment rail provides continuous attachment positions.

18. The attachment rail of claim 16,
wherein the attachment rail includes a profile cross section that is singly or multiply beveled and/or bent.
19. The attachment rail of claim 16,
wherein one or more additional rail units are provided with a profile cross section having a depression for introducing one or more bracket units that can be plugged or slipped onto the attachment rail.
20. The attachment rail of claim 19,
wherein the attachment rail includes a periodic surface and/or edge profiling running in the longitudinal direction as index notches, on and/or into which rail units can be latched.
21. The attachment rail of claims 16,
wherein the attachment rail includes a substantially c-shaped profile cross section for accommodating bracket units.
22. The attachment rail of claim 16,
wherein the attachment rail includes a perforated grid for accommodating bracket units.
23. The attachment rail of claim 1,
wherein the attachment rail provides continuous attachment positions.

* * * * *